(12) United States Patent
Bailloeul et al.

(10) Patent No.: US 10,225,285 B2
(45) Date of Patent: Mar. 5, 2019

(54) POLICY CONFLICT RESOLUTION ENGINE FOR MOBILE APPLICATION MANAGEMENT

(71) Applicant: CA, Inc., New York, NY (US)

(72) Inventors: Timothee Bailloeul, Sunnyvale, CA (US); Vikas Krishna, San Jose, CA (US)

(73) Assignee: CA, Inc., New York, NY (US)

( * ) Notice: Subject to any disclaimer, the term of this patent is extended or adjusted under 35 U.S.C. 154(b) by 184 days.

(21) Appl. No.: 14/605,195

(22) Filed: Jan. 26, 2015

(65) Prior Publication Data
US 2016/0219075 A1 Jul. 28, 2016

(51) Int. Cl.
*H04L 29/06* (2006.01)
*H04W 12/08* (2009.01)
*G06Q 10/06* (2012.01)

(52) U.S. Cl.
CPC ............. *H04L 63/20* (2013.01); *G06Q 10/06* (2013.01); *H04W 12/08* (2013.01)

(58) Field of Classification Search
CPC ........ H04L 63/20; G06Q 10/06; H04W 12/08
See application file for complete search history.

(56) References Cited

U.S. PATENT DOCUMENTS

| | | | | |
|---|---|---|---|---|
| 9,246,941 | B1* | 1/2016 | Gibson | H04L 63/20 |
| 2009/0199192 | A1* | 8/2009 | Laithwaite | G06Q 10/06 718/104 |
| 2014/0283059 | A1* | 9/2014 | Sambamurthy | G06F 21/55 726/23 |
| 2015/0089673 | A1* | 3/2015 | Beckman | H04L 63/105 726/29 |

* cited by examiner

*Primary Examiner* — Linglan E Edwards
*Assistant Examiner* — Forrest L Carey
(74) *Attorney, Agent, or Firm* — Sage Patent Group (57) ABSTRACT

A method includes performing operations as follows on a processor: receiving a notification from a mobile application management server in an enterprise through which mobile device usage policies for the enterprise are managed that a policy change has occurred with respect to use of mobile devices in the enterprise, communicating with a work planning system in the enterprise to determine whether the policy change adversely affects work planned by an end user, and sending an alert to the mobile application management server responsive to a determination that the policy change adversely affects the work planned by the user.

19 Claims, 5 Drawing Sheets

POLICY CONFLICT RESOLUTION ENGINE FOR MOBILE APPLICATION MANAGEMENT

BACKGROUND

The present disclosure relates to computing systems, and, in particular, to security management of mobile devices and improving productivity when using mobile devices and/or applications.

Mobile Application Management (MAM) may involve security measures to protect applications and data on mobile devices. For example, an enterprise may adopt policies that include restrictions on invoking certain applications or accessing certain types of data or files to ensure that sensitive information is not compromised. These restrictions may include operation limitations, geo fence limitations, time of day/week limitations, and access limitations. The policies may also include requirements that various applications and/or other software components, such as operating systems, be upgraded before certain applications and/or data can be used. While such policies have a valid purpose in enhancing the security of mobile devices, the policies may be conceived and implemented with little input or participation of the end user. A MAM administrator when creating a policy may not be aware that the policy may negatively impact and/or prevent one or more end-users from doing their work. Conversely, when an end-user is planning work that involves using applications, content, and/or data that are under MAM management or supervision, the end user may not be aware that such work may be affected by one or more MAM policies.

SUMMARY

In some embodiments of the inventive subject matter, a method comprises performing operations as follows on a processor: receiving a notification from a mobile application management server in an enterprise through which mobile device usage policies for the enterprise are managed that a policy change has occurred with respect to use of mobile devices in the enterprise, communicating with a work planning system in the enterprise to determine whether the policy change adversely affects work planned by an end user, and sending an alert to the mobile application management server responsive to a determination that the policy change adversely affects the work planned by the user.

In still other embodiments of the inventive subject matter, a method comprises performing operations as follows on a processor: communicating with a work planning system in an enterprise to determine whether a change has occurred with respect to work planned by an end user, determining whether the change with respect to the work planned by the end user is adversely affected by a policy that applies to use of mobile devices in the enterprise, and sending an alert to the end user responsive to a determination that the change with respect to the work planned by the end user is adversely affected by the policy.

In still other embodiments of the inventive subject matter, a computer program product comprises a tangible computer readable storage medium comprising computer readable program code embodied in the medium that when executed by a processor causes the processor to perform operations comprising: receiving a notification from a mobile application management server in an enterprise through which mobile device usage policies for the enterprise are managed that a policy change has occurred with respect to use of mobile devices in the enterprise, communicating with a work planning system in the enterprise to determine whether the policy change adversely affects work planned by an end user, and sending an alert to the mobile application management server responsive to a determination that the policy change adversely affects the work planned by the user.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

Mobile Application Management (MAM) may involve security measures to protect applications and data on mobile devices. For example, an enterprise may adopt policies that include restrictions on invoking certain applications or accessing certain types of data or files to ensure that sensitive information is not compromised. These restrictions may include operation limitations, geo fence limitations, time of day/week limitations, and access limitations. The policies may also include requirements that various applications and/or other software components, such as operating systems, be upgraded before certain applications and/or data can be used. Some embodiments of the inventive subject matter stem from a realization that a MAM administrator when creating a policy may not be aware that the policy may negatively impact and/or prevent one or more end-users from doing their work. Conversely, when an end-user is planning work that involves using resources, such as applications, content, and/or data that are under MAM management or supervision, the end user may not be aware that such work may be affected by one or more MAM policies. According to some embodiments of the inventive subject matter, a policy conflict resolution engine is used to notify end users and/or MAM administrators when new policies may conflict with user work and/or when user work may conflict with existing MAM policies.

In some embodiments, a MAM policy conflict resolution engine is created that is configured to communicate with or designed as part of a MAM policy server where administrators create and deploy MAM policies for an enterprise. The MAM policy conflict resolution engine is also configured to communicate with end user mobile devices, systems, and/or work production servers associated with the enterprise where an end user (e.g., employee) plans work. The MAM policy conflict resolution engine may communicate with various modules/applications used by an end user in planning work including, but not limited to, resources, such as a calendar system, collaboration wiki system, email system, enterprise social media system, and the like. When a MAM administrator defines a new MAM policy that may impact an end user, i.e., impacts applications, content, data or other resource associated with the end user's planned work, the MAM policy conflict resolution engine crawls the various information sources that may indicate the type of work the end user has planned and the resources involved to determine if there will be a potential conflict with the new MAM policy and the work that is planned. When one or more conflicts are found, the MAM policy conflict resolution engine may generate an alert to notify the MAM administrator to allow the MAM administrator to adjust the policy, to remove or alleviate the conflict, and/or to inform the end user that the end user's work will be impacted by the new policy. An alert may also be generated to notify the end user of the policy conflict with the end user's planned work.

In further embodiments, when an end user is planning work, work plans are captured in the various information sources described above. The MAM policy conflict resolution engine is configured to periodically probe these information sources and check whether any conflict exists between work that is planned and an existing MAM policy, i.e., the policy impacts resources, such as applications, content, data or other resource associated with the end user's planned work. If a conflict is detected, an alert may be generated to notify the end-user so that the conflict can be resolved with the MAM administrator. In addition, an alert may also be generated to notify the MAM administrator of conflicts so that the MAM administrator can consider updating existing policies to avoid or alleviate restrictions on the user when the user is trying to perform the work. In some embodiments, the MAM policy conflict resolution engine may provide advice to the end user so that the user can adjust the work plans to avoid falling under the restrictions and/or rules associated with one or more MAM policies.

Figure 1:
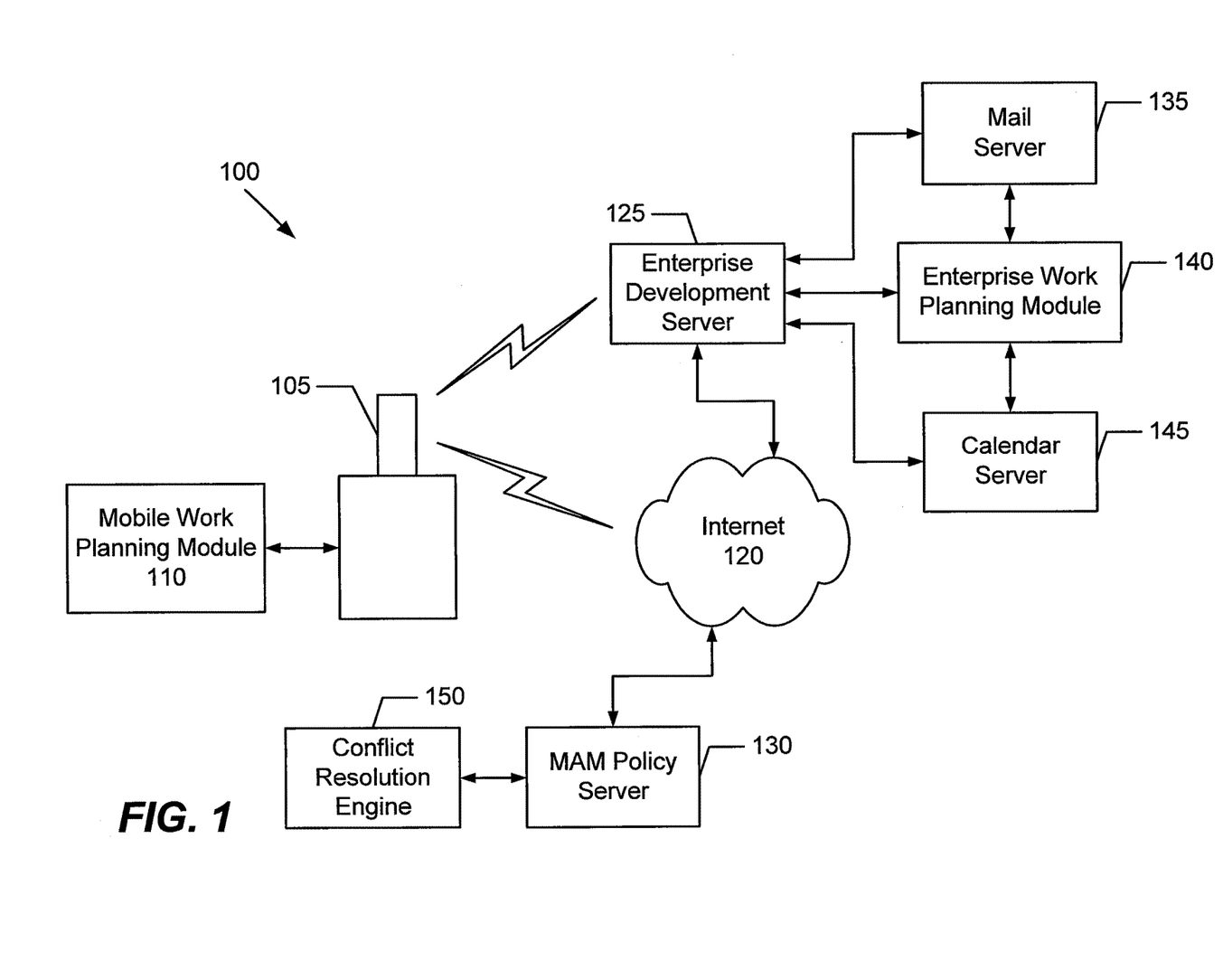
FIG. 1 is a block diagram of a system for resolving policy conflicts between mobile application policies and user work plans in accordance with some embodiments of the inventive subject matter.

FIG. 1 is a block diagram of a system for resolving policy conflicts between mobile application policies and user work plans in accordance with some embodiments of the inventive subject matter. Employees of an enterprise, for example, may use mobile devices, such as smart phones, tablets, laptops, and the like to access various types of content belonging to the enterprise to do their work. As shown in FIG. 1, a user may use a mobile device 105 to communicate with various servers in an enterprise to plan and perform work including, but not limited to, an enterprise development server 125, a mail server 135, and a calendar server 145 using a direct wireless connection or via various networks, which are represented by the Internet 120. The enterprise development server 125, mail server 135, and calendar server 145 are merely representative of some of the servers associated with the enterprise. It will be understood that an enterprise may have fewer, additional, and/or different server data processing systems than those shown in FIG. 1, which are responsible for various operations of the enterprise, and that the particular functional responsibilities may be combined or divided in a variety of ways. Moreover, the servers may be implemented as separate servers on individual hardware platforms or as virtual servers on a common hardware platform. In addition, the functionality of various servers may be combined in a single server or separated into additional servers in accordance with various embodiments of the inventive subject matter.

Because mobile devices are typically more susceptible to being stolen, lost, or compromised versus desktop computing devices, the MAM policy server 130 may be used to create, amend/modify, and manage policies for using mobile devices to access enterprise resources. As shown in FIG. 1, the MAM policy server 130 may download a mobile work planning module 110 and an enterprise work planning module 140 to the mobile device 105 and various enterprise servers, respectively. The mobile work planning module 110 and enterprise work planning module 140 may be used to monitor resources associated with the mobile device 105 and the enterprise servers 125, 135, and 145 to detect a user's work plans. These resources may include, but are not limited to, a calendar system, collaboration wiki system, email system, social media system, project management applications/programs, project development tools, and the like. It will be understood that the functionality of some resources may be similar on both the enterprise servers 125, 135, and 145 and the mobile device 105. For example, the mobile device 105 may have an email application, calendar application, social media application, etc. with analogous applications on the mail server 135, calendar server 145, and/or other enterprise servers. In some embodiments, the user may also access multiple enterprise development servers 125 that correspond to different projects that the user contributes to. In other embodiments, an enterprise may use a single development server for all projects in the enterprise.

The MAM policy server 130 may further include a conflict resolution engine module 150. In the example shown in FIG. 1, the MAM policy conflict resolution engine module 150 is configured as part of the MAM policy server 130. In other embodiments, the conflict resolution engine module 150 may be embodied in a separate server from the MAM policy server 130.

The MAM policy conflict resolution engine module 150 may be configured to communicate with the mobile device 105 and the work production servers associated with the enterprise (enterprise development server 125, mail server 135, and calendar server 145) where an end user (e.g., employee) plans work via the mobile work planning module 110 and the enterprise work planning module 140. In particular, the MAM policy conflict resolution engine module 150 may communicate to gather information on various modules/applications used by an end user in planning work including, but not limited to, resources, such as a calendar system, collaboration wiki system, email system, enterprise social media system, and the like. As explained above, when a MAM administrator defines a new MAM policy (or modified an existing MAM policy) that may impact an end user, i.e., impacts applications, content, data or other resource associated with the end user's planned work, the MAM policy conflict resolution engine 150 crawls the various information sources that may indicate the type of work the end user has planned and the resources involved via the mobile work planning module 110 and the enterprise work planning module 140 to determine if there will be a potential conflict with the new or modified MAM policy and the work that is planned. When one or more conflicts are found, the MAM policy conflict resolution engine module 150 may generate an alert to notify the MAM administrator to allow the MAM administrator to adjust the policy, to remove or alleviate the conflict, and/or to inform the end user that the end user's work will be impacted by the new or modified policy. An alert may also be generated to notify the end user of the policy conflict with the end user's planned work.

In further embodiments, the MAM policy conflict resolution engine module 150 is configured to periodically probe the information resources regarding an end user's work plans and check whether any conflict exists between work that is planned and an existing MAM policy, i.e., the policy impacts resources, such as applications, content, data or other resource associated with the end user's planned work. If a conflict is detected, the MAM policy conflict resolution engine module 150 may generate an alert to notify the end-user so that the conflict can be resolved with the MAM administrator. In addition, an alert may also be generated to notify the MAM administrator of conflicts so that the MAM administrator can consider updating existing policies to avoid or alleviate restrictions on the user when the user is trying to perform the work. In some embodiments, the MAM policy conflict resolution engine module 150 may provide advice to the end user so that the user can adjust the work plans to avoid falling under the restrictions and/or rules associated with one or more MAM policies.

As shown in FIG. 1, the connections between the enterprise development server 125, mail server 135, calendar server 145, MAM policy server 130, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. Although the enterprise development server 125, mail server 135, and calendar server 145 are shown as being directly connected to one another, it will be understood that these enterprise servers may be connected by one or more networks and/or may be combined in various ways through one or more hardware platforms and/or virtualization implementations.

Although FIG. 1 illustrates a system for resolving policy conflicts between mobile application policies and user work plans according to some embodiments of the inventive subject matter, it will be understood that embodiments of the present invention are not limited to such configurations, but are intended to encompass any configuration capable of carrying out the operations described herein.

Figure 2:
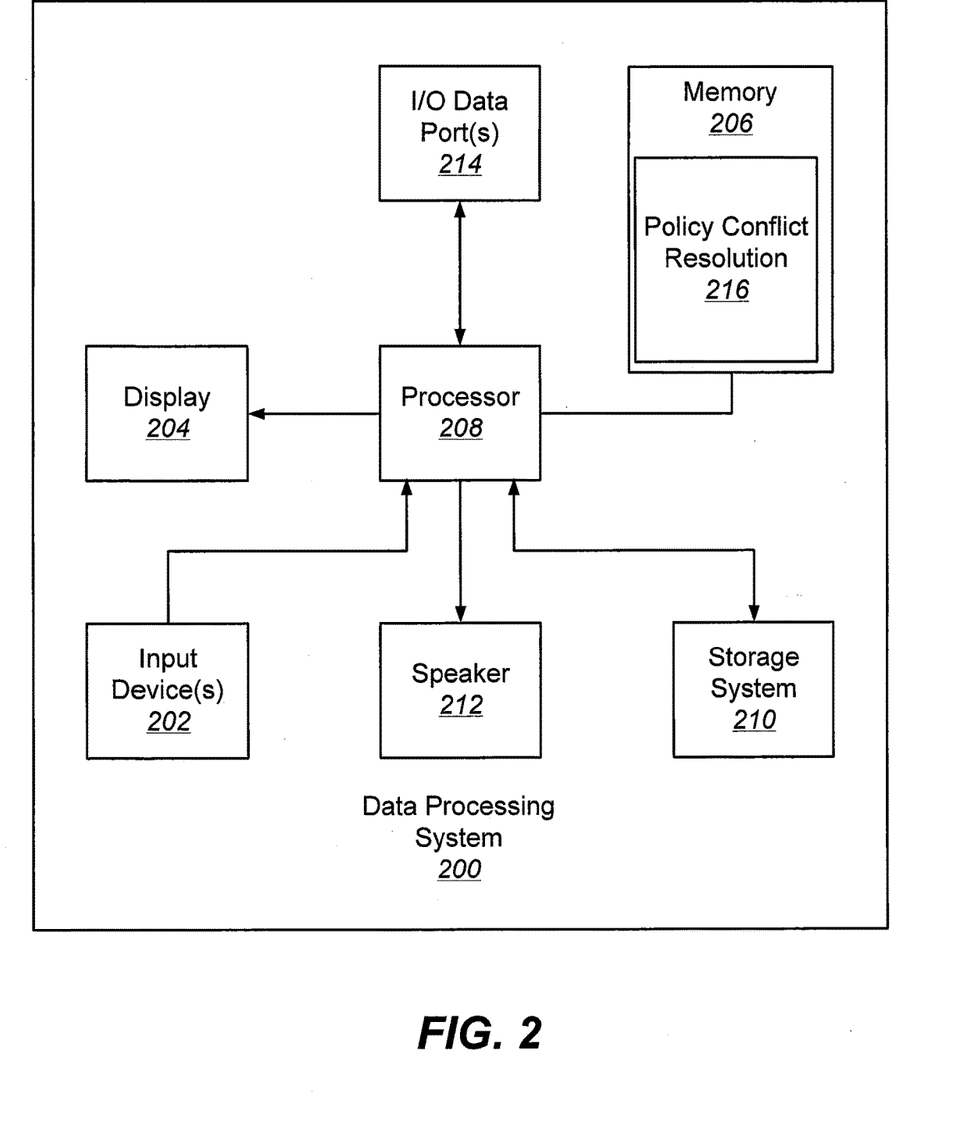
FIG. 2 illustrates a data processing system that may be used to implement the Mobile Application Management (MAM) policy server of FIG. 1 in accordance with some embodiments of the inventive subject matter.

Referring now to FIG. 2, a data processing system 200 that may be used to implement the MAM policy server 130 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a policy conflict resolution module 216 that may be configured to provide the mobile work planning module 110, enterprise work planning module 140, and conflict resolution engine 150 of FIG. 1 according to some embodiments of the inventive subject matter.

Figure 3:
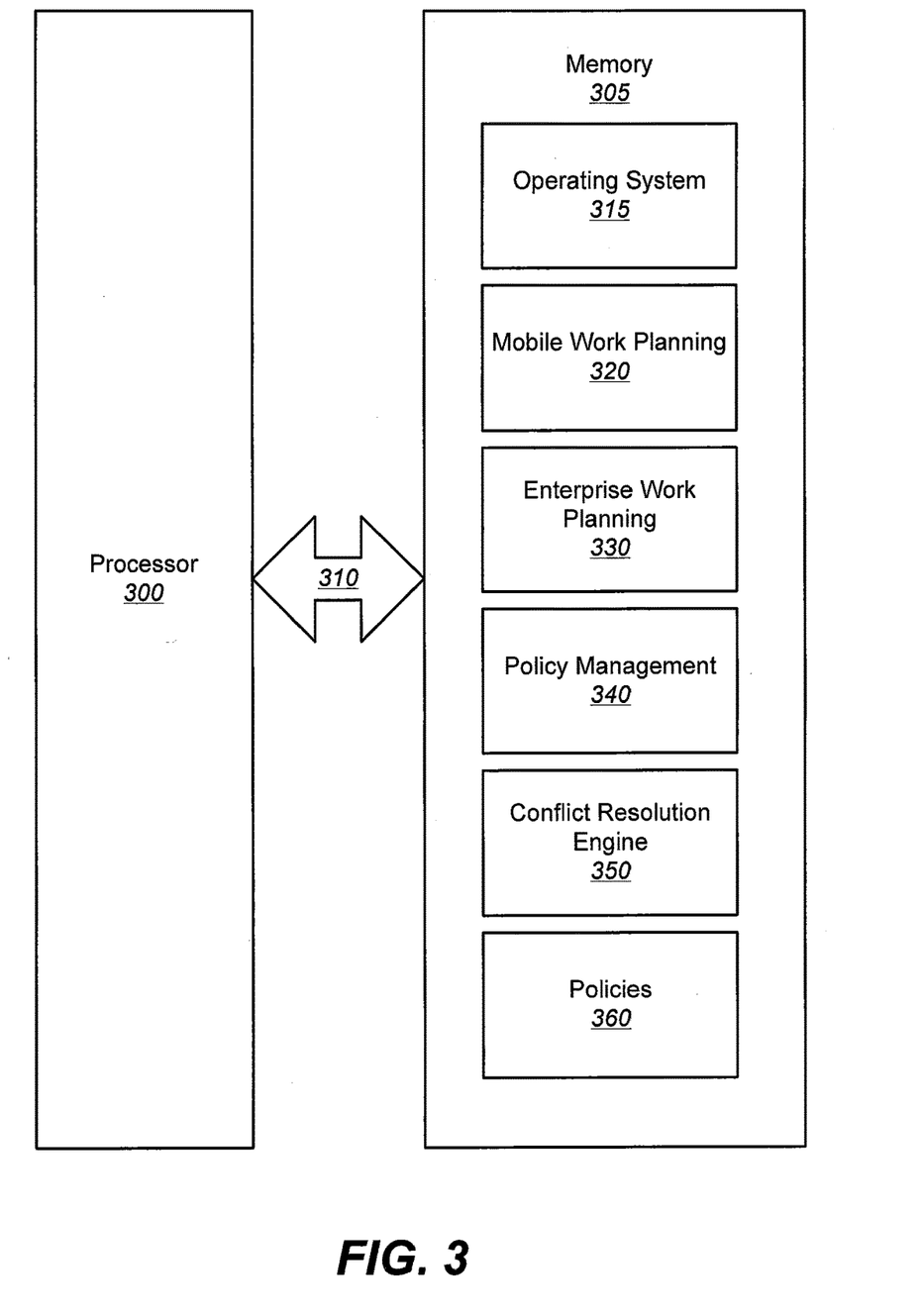
FIG. 3 is a block diagram that illustrates a software/hardware architecture for the MAM policy server of FIG. 1 in accordance with some embodiments of the present inventive subject matter.

FIG. 3 illustrates a processor 300 and memory 305 that may be used in embodiments of data processing systems, such as the MAM policy server 130 of FIG. 1 and the data processing system 200 of FIG. 2, respectively, for resolving policy conflicts between mobile application policies and user work plans according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for resolving policy conflicts between mobile application policies and user work plans in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to six or more categories of software and/or data: an operating system 315, a mobile work planning module 320, an enterprise work planning module 330, a policy management module 340, a conflict resolution engine 350, and a policies module 360. In particular, the operating system 315 may manage the data processing system's software and/or hardware resources and may coordinate execution of programs by the processor 300. The mobile work planning module 320 may correspond to the mobile work planning module 110 of FIG. 1 and the enterprise work planning module 330 may correspond to the enterprise work planning module 140 of FIG. 1. As described above, the mobile work planning module 320 and enterprise work planning module 130 may be used to monitor resources associated with the mobile device 105 and the enterprise servers 125, 135, and 145 to detect a user's work plans. These resources may include, but are not limited to, a calendar system, collaboration wiki system, email system, social media system, project management applications/programs, project development tools, and the like.

The policy management module 340 may be configured to allow a MAM administrator to create, modify, and generally manage MAM policies 360 for the enterprise. In some embodiments, the policy management module 340 may provide a document change management functionality to allow multiple people to edit documents while providing a history of what changes were made and when along with the ability to undo changes before they are approved to be made permanent. The policy management module 340 may also provide functionality to distribute the policies 360 to the appropriate personnel and/or repositories where they can be viewed by the target audiences.

The conflict resolution engine module 350 may correspond to the conflict resolution engine module 150 of FIG. 1. As described above, the MAM policy conflict resolution engine module 350 may be configured to communicate with the mobile device 105 and the work production servers associated with the enterprise (enterprise development server 125, mail server 135, and calendar server 145) where an end user (e.g., employee) plans work via the mobile work planning module 110 and the enterprise work planning module 140. In particular, the MAM policy conflict resolution engine module 350 may communicate to gather information on various modules/applications used by an end user in planning work including, but not limited to, resources, such as a calendar system, collaboration wiki system, email system, enterprise social media system, and the like. The MAM policy conflict resolution engine 150 may crawl the various information sources that may indicate the type of work the end user has planned and the resources involved via the mobile work planning module 110 and the enterprise work planning module 140 to determine if there will be a potential conflict with a new or modified MAM policy and the work that is planned. When one or more conflicts are found, the MAM policy conflict resolution engine module 350 may generate an alert to notify the MAM administrator to allow the MAM administrator to adjust the policy, to remove or alleviate the conflict, and/or to inform the end user that the end user's work will be impacted by the new policy. An alert may also be generated to notify the end user of the policy conflict with the end user's planned work.

In further embodiments, the MAM policy conflict resolution engine module 350 is configured to periodically probe the information resources regarding an end user's work plans and check whether any conflict exists between work that is planned and an existing MAM policy, i.e., the policy impacts resources, such as applications, content, data or other resource associated with the end user's planned work. If a conflict is detected, the MAM policy conflict resolution engine module 350 may generate an alert to notify the end-user so that the conflict can be resolved with the MAM administrator. In addition, an alert may also be generated to notify the MAM administrator of conflicts so that the MAM administrator can consider updating existing policies to avoid or alleviate restrictions on the user when the user is trying to perform the work. In some embodiments, the MAM policy conflict resolution engine module 350 may provide advice to the end user so that the user can adjust the work plans to avoid falling under the restrictions and/or rules associated with one or more MAM policies.

Although FIG. 3 illustrates hardware/software architectures that may be used in data processing systems, such as the MAM policy server 130 of FIG. 1 and the data processing system 200 of FIG. 2, respectively, for resolving policy conflicts between mobile application policies and user work plans according to some embodiments of the inventive subject matter, it will be understood that the present invention is not limited to such a configuration but is intended to encompass any configuration capable of carrying out operations described herein.

Figure 4:
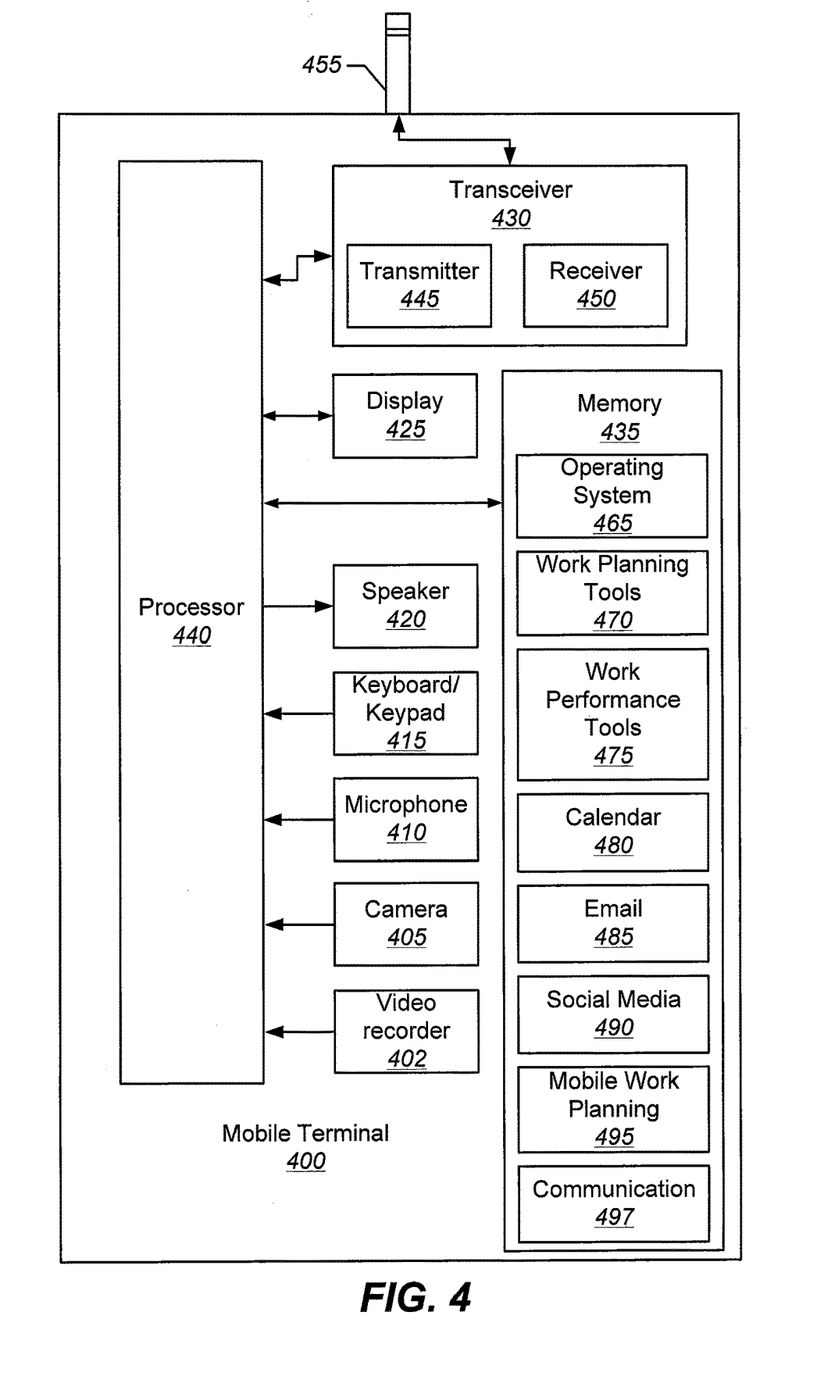
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminal 105 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to resolve policy conflicts between mobile application policies and user work plans in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to eight or more categories of software and/or data: an operating system 465, a work planning tools module 470, a work performance tools module 475, a calendar module 480, an email module 485, a social media module 490, a mobile work planning module 495, and a communication module 497. The operating system 465 generally controls the operation of the mobile terminal 400. In particular, the operating system 465 may manage the mobile terminal's software and/or hardware resources and may coordinate execution of programs by the processor 440. The work planning tools module 470 may be configured to provide one or more project management tools to allow individuals to track deliverables, deadlines, meetings, and the like. These tools may provide statistics on the progress of a project to more readily identity what benchmarks have been completed and what benchmarks remain to be completed. The work performance tools module 475 may be configured to provide one or more tools that are used in the performance of some work task. These tools may vary depending on the type of work the end user is doing whether it's engineering, marketing, finance, advertising, accounting, etc. The calendar module 480 may be configured to schedule and track a variety of events, meetings, tasks, and the like. The email module 485 may be configured to send and receive electronic mail as well as manage sent and received messages. The social media module 490 may be configured to represent one or more social media applications, such as Facebook, Twitter, and the like.

The mobile work planning module 495 may correspond to the mobile work planning module 320 of FIG. 3 and the mobile work planning module 110 of FIG. 1. As described above, the mobile work planning module 495 may be used to monitor resources associated with the mobile device 105 to detect a user's work plans. These resources may include, but are not limited to, a calendar system, collaboration wiki system, email system, social media system, project management applications/programs, project development tools, and the like. These and other resources may be provided through the work planning tools module 470, the work performance tools module 475, the calendar module 480, the email module 485, and the social media module 490.

The communication module 497 may be configured to facilitate communication between the mobile terminal 105/400 and other entities, such as the enterprise development server 125, mail server 135, calendar server 145, and MAM policy server 130.

Although FIG. 4 illustrates an exemplary software and hardware architecture that may be used for resolving policy conflicts between mobile application policies and user work plans according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MAM policy server 130, data processing system 200, hardware/software architecture of FIG. 3, enterprise development server 125, mail server 135, calendar server 145, and mobile device 105/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
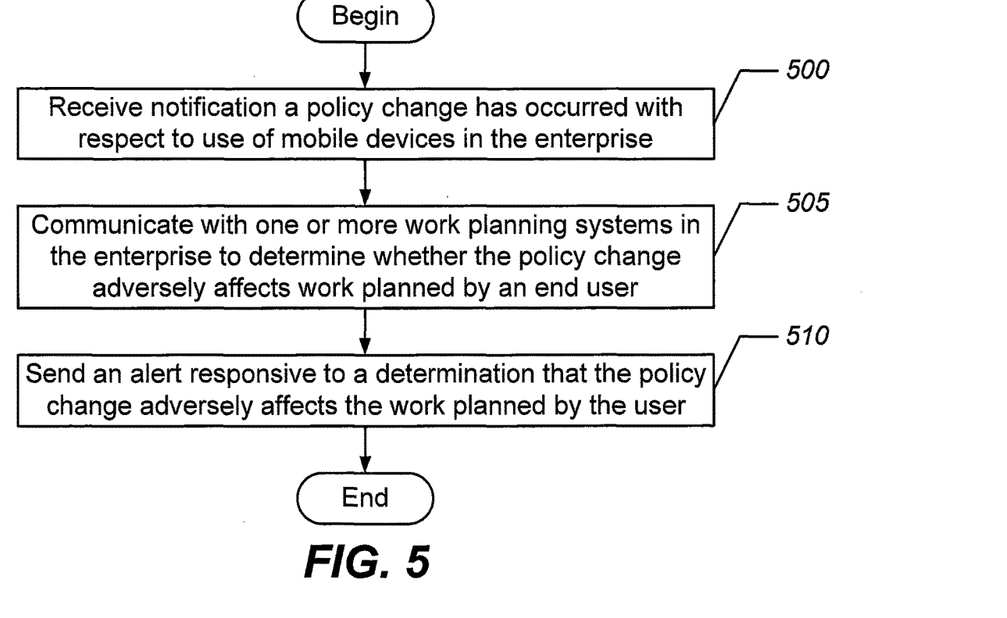
FIGS. 5 and 6 are flowcharts that illustrate operations for resolving policy conflicts between mobile application policies and user work plans in accordance with some embodiments of the inventive subject matter.
Figure 6:
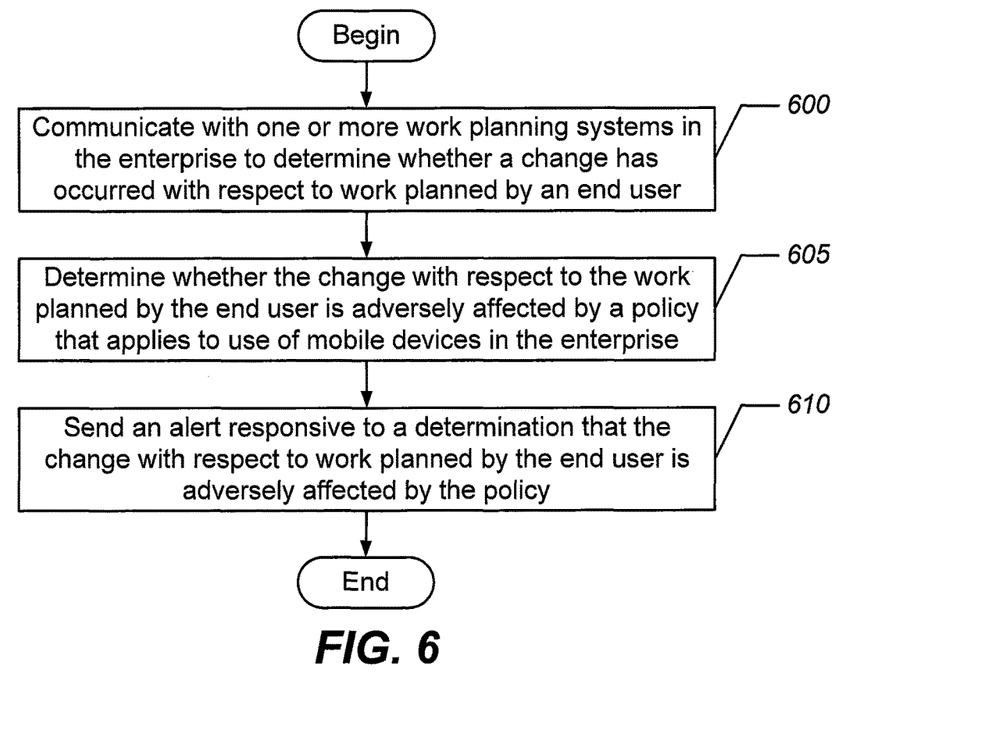

FIGS. 5 and 6 are flowcharts that illustrate operations for resolving policy conflicts between mobile application policies and user work plans in accordance with some embodiments of the inventive subject matter. Referring now to FIG. 5, operations begin at block 500 where, for example, the conflict resolution engine module 350 of the MAM policy server 130 receives a notification that a policy change has occurred with respect to use of mobile devices in the enterprise. This change may be the result of a new policy or a modification of an existing policy through the policy management module 340. The conflict resolution engine module 350 may then communicate with the mobile work planning module 110 and/or the enterprise work planning module 140 at block 505 to determine whether the policy change adversely affects work planned by the end user. As described above, the mobile work planning module 110 and enterprise work planning module 130 may be used to monitor resources associated with the mobile device 105 and the enterprise servers 125, 135, and 145 to detect a user's work plans. These resources may include, but are not limited to, a calendar system, collaboration wiki system, email system, social media system, project management applications/programs, project development tools, and the like. In general, the resources may include applications, content, and/or data. The conflict resolution engine module 350 may collect the user work plan information from the mobile work planning module 110 and/or enterprise work planning module 130 and may analyze it in light of the policy change to determine whether the user's work plans are adversely affected. The conflict resolution engine module 350 may generate an alert at block 510 responsive to a determination that the policy change does adversely affect the work planned by a user. This alert may be sent to the end user or to the policy management module 340 of the MAM policy server 130 to notify a MAM administrator of the conflict.

Further embodiments are illustrated with respect to FIG. 6 with operations beginning at block 600 where, for example, the conflict resolution engine module 350 communicates with the mobile work planning module 110 and/or the enterprise work planning module 140 to determine whether there has been a change in the user's work plans. As described above, the mobile work planning module 110 and enterprise work planning module 130 may be used to monitor resources associated with the mobile device 105 and the enterprise servers 125, 135, and 145 to detect a user's work plans. These resources may include, but are not limited to, a calendar system, collaboration wiki system, email system, social media system, project management applications/programs, project development tools, and the like. In general, the resources may include applications, content, and/or data. When there has been a change in the user's work plans, the conflict resolution engine module 350 may determine at block 605 whether the change is adversely affected by one or more MAM policies that have been defined to govern use of mobile devices in the enterprise. The conflict resolution engine module 350 may generate an alert at block 610 responsive to a determination that the change in the use's work plans is adversely affected by one or more MAM policies. This alert may be sent to the end user or to the policy management module 340 of the MAM policy server 130 to notify a MAM administrator of the conflict.

For example, the conflict resolution engine module 350 may determine that a user has new plans to travel to a particular geographic location for a work function. The MAM policies, however, includes a geofencing policy that restricts the use of mobile devices for accessing enterprise resources from that geographic location. The conflict resolution engine module 350 may generate an alert to the user and/or the MAM administrator notifying them of the conflict between the users work plans and the MAM geofencing policy. The user can then make plans to either comply with the plan by making other arrangements such that a mobile device is not needed for this work function or the MAM administrator may, for example, temporarily relax the geofencing policy (or eliminate the policy altogether) for this user's trip to allow the user to use a mobile device from the geographic location.

Embodiments of the present inventive subject matter may assist an enterprise in improving efficiency in the manner in which the enterprise's mobile devices are used by detecting conflicts between work planned by the enterprise's employees, for example, and policies instituted by the enterprise governing the use of mobile devices. By alerting users of the mobile devices and/or MAM policy administrators of the conflict, the policy/policies can be adjusted, work plans can be adjusted, and/or other types of mitigating actions can be taken to ensure that users'productivity is not unduly impacted while still maintaining a desired level of security with respect to how mobile devices are used in the enterprise.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
performing operations as follows on a processor:
receiving, via a communication network, a notification from a mobile application management server in an enterprise through which mobile device usage policies for the enterprise are managed that a policy change has occurred with respect to use of mobile devices in the enterprise, the policy change comprising a geographic restriction of the use of the mobile devices in the enterprise;
communicating with a work planning system in the enterprise via the communication network, the work planning system monitoring resources associated with the mobile device of an end user that store information relating to a geographic location associated with work scheduled by the end user where the policy change restricts use of mobile devices of end users at the geographic location, to determine whether the policy change adversely affects work scheduled by the end user;
sending, via the communication network, an alert to the mobile application management server responsive to a determination that the policy change adversely affects the work scheduled by the end user; and
receiving, via the communication network, an adjustment to the policy change for the end user from the mobile application management server that alleviates restrictions on the end user to use the mobile device of the end user in the enterprise at the geographic location when the end user is performing work at the geographic location.

2. The method of claim 1, further comprising:
sending an alert to the end user responsive to the determination that the policy change adversely affects the work scheduled by the user.

3. The method of claim 1, wherein the policy change comprises a new policy with respect to the use of the mobile devices in the enterprise.

4. The method of claim 1, wherein the policy change comprises a modification to an existing policy with respect to the use of the mobile devices in the enterprise.

5. The method of claim 1, wherein the work planning system comprises one of a calendar system, collaboration wiki system, email system, and enterprise social media system.

6. The method of claim 1, wherein communicating with the work planning system comprises:
communicating with the work planning system to determine whether the change adversely affects a resource used by the end user in performing the work.

7. The method of claim 6, wherein the resource comprises an application, content, and/or data.

8. A method, comprising:
performing operations as follows on a processor:
communicating with a work planning system in an enterprise via a communication network, the work planning system monitoring resources associated with a mobile device of an end user that store information relating to a geographic location associated with work scheduled by the end user where a policy change restricts use of mobile devices of end users at the geographic location, to determine whether a change has occurred with respect to work scheduled by the end user;
determining whether the change with respect to the work scheduled by the end user is adversely affected by a policy that applies to use of mobile devices in the enterprise, the policy comprising a geographic restriction of use of mobile devices in the enterprise;

sending, via the communication network, an alert to the end user responsive to a determination that the change with respect to the work scheduled by the end user is adversely affected by the policy; and receiving, via the communication network, an adjustment to the policy change for the end user from the mobile application management server that alleviates restrictions on the end user to use the mobile device of the end user in the enterprise at the geographic location when the end user is performing work at the geographic location.

9. The method of claim 8, further comprising:

sending an alert to a mobile application management server in the enterprise through which mobile device usage policies for the enterprise are managed responsive to the determination that the change with respect to the work scheduled by the end user is adversely affected by the policy.

10. The method of claim 8, wherein the work planning system comprises one of a calendar system, collaboration wiki system, email system, and enterprise social media system.

11. The method of claim 8, wherein communicating with the work planning system comprises:

communicating with the work planning system to determine whether the change with respect to the work scheduled by the end user affects a resource used by the end user in performing the work.

12. The method of claim 11, wherein the resource comprises an application, content, and/or data.

13. A computer program product, comprising:

a non-transitory computer readable storage medium comprising computer readable program code embodied in the medium that when executed by a processor causes the processor to perform operations comprising:

receiving, via a communication network, a notification from a mobile application management server in an enterprise through which mobile device usage policies for the enterprise are managed that a policy change has occurred with respect to use of mobile devices in the enterprise, the policy change comprising a geographic restriction of the use of the mobile devices in the enterprise;

communicating with a work planning system in the enterprise via the communication network, the work planning system monitoring resources associated with the mobile device of an end user that store information relating to a geographic location associated with work scheduled by the end user where the policy change restricts use of mobile devices of end users at the geographic location, to determine whether the policy change adversely affects work scheduled by the end user;

sending, via the communication network, an alert to the mobile application management server responsive to a determination that the policy change adversely affects the work scheduled by the end user; and receiving, via the communication network, an adjustment to the policy change for the end user from the mobile application management server that alleviates restrictions on the end user to use the mobile device of the end user in the enterprise at the geographic location when the end user is performing work at the geographic location.

14. The computer program product of claim 13, further comprising:

sending an alert to the end user responsive to the determination that the policy change adversely affects the work scheduled by the user.

15. The computer program product of claim 13, wherein the policy change comprises a new policy with respect to the use of the mobile devices in the enterprise.

16. The computer program product of claim 13, wherein the policy change comprises a modification to an existing policy with respect to the use of the mobile devices in the enterprise.

17. The computer program product of claim 13, wherein the work planning system comprises one of a calendar system, collaboration wiki system, email system, and enterprise social media system.

18. The computer program product of claim 13, wherein communicating with the work planning system comprises:

communicating with the work planning system to determine whether the change adversely affects a resource used by the end user in performing the work.

19. The computer program product of claim 18, wherein the resource comprises an application, content, and/or data.

* * * * *